(12) United States Patent
Pomet (10) Patent No.: US 6,230,178 B1
(45) Date of Patent: May 8, 2001

(54) METHOD FOR THE PRODUCTION OF AN ERROR CORRECTION PARAMETER ASSOCIATED WITH THE IMPLEMENTATION OF A MODULAR OPERATION ACCORDING TO THE MONTGOMERY METHOD

(75) Inventor: Alain Pomet, Rousset (FR)

(73) Assignee: STMicroelectronics S.A., Gentilly (FR)

(*) Notice: Subject to any disclaimer, the term of this patent is extended or adjusted under 35 U.S.C. 154(b) by 0 days.

(21) Appl. No.: 09/190,734

(22) Filed: Nov. 12, 1998

(30) Foreign Application Priority Data

Nov. 24, 1997 (FR) .................................................. 97-14879

(51) Int. Cl.⁷ ....................................................... G06F 7/72
(52) U.S. Cl. .............................................................. 708/491
(58) Field of Search ...................................... 708/491, 492

(56) References Cited

U.S. PATENT DOCUMENTS

| | | | |
|---|---|---|---|
| 3,684,879 | 8/1972 | Koehler | 708/656 |
| 4,989,173 | 1/1991 | Kaneda | 708/653 |
| 5,724,279 | * 3/1998 | Benoloh et al. | 708/491 |
| 5,751,620 | * 5/1998 | Monier | 708/492 |
| 5,764,554 | * 6/1998 | Monier | 708/491 |
| 5,777,916 | * 7/1998 | Monier | 708/492 |
| 5,793,659 | * 8/1998 | Chen et al. | 708/491 |
| 5,793,660 | * 8/1998 | Rentschler | 708/491 |
| 5,912,904 | * 6/1999 | Monier | 708/491 |
| 5,928,315 | * 7/1999 | Kobayashi et al. | 708/491 |

FOREIGN PATENT DOCUMENTS 0 785 502 A1  12/1996  (EP) .................................. G06F/7/72

OTHER PUBLICATIONS

R.G. Saltman, "*Reducing Computing Time for Synchronous Binary Division,*" IRE Transactions on Electronic Computers, vol. EC–10, No. 2, Jun. 1961, pp. 169–174.

* cited by examiner

Primary Examiner—David H. Malzahn
(74) Attorney, Agent, or Firm—Theodore E. Galanthay; Allen, Dyer, Doppelt, Milbrath & Gilchrist, P.A.

(57) ABSTRACT

A modular arithmetic coprocessor comprises a circuit for the computation of an error correction parameter $H=2^x \mod N$ associated with the Montgomery method. This computation circuit comprises a first register, a second register, and a first circuit for the series subtraction of either zero, N, twice N, or three times N from the contents of the first register. A multiplication circuit carries out a multiplication by four. A second circuit compares the result with N, twice N or three times N.

22 Claims, 4 Drawing Sheets

METHOD FOR THE PRODUCTION OF AN ERROR CORRECTION PARAMETER ASSOCIATED WITH THE IMPLEMENTATION OF A MODULAR OPERATION ACCORDING TO THE MONTGOMERY METHOD

FIELD OF THE INVENTION

The invention relates to modular computations and, more particularly, to a method for the production of an error correction parameter associated with the implementation of a modular operation according to the Montgomery method.

BACKGROUND OF THE INVENTION

Modular computations in a finite field, or Galois field, are denoted as $GF(2^n)$. Modular operations on $GF(2^n)$ are used in cryptography for various applications, such as authentication of messages, identification of a user, and exchange of keys. Exemplary applications are described in the French Patent Application No. 2 679 054.

Figure 1:
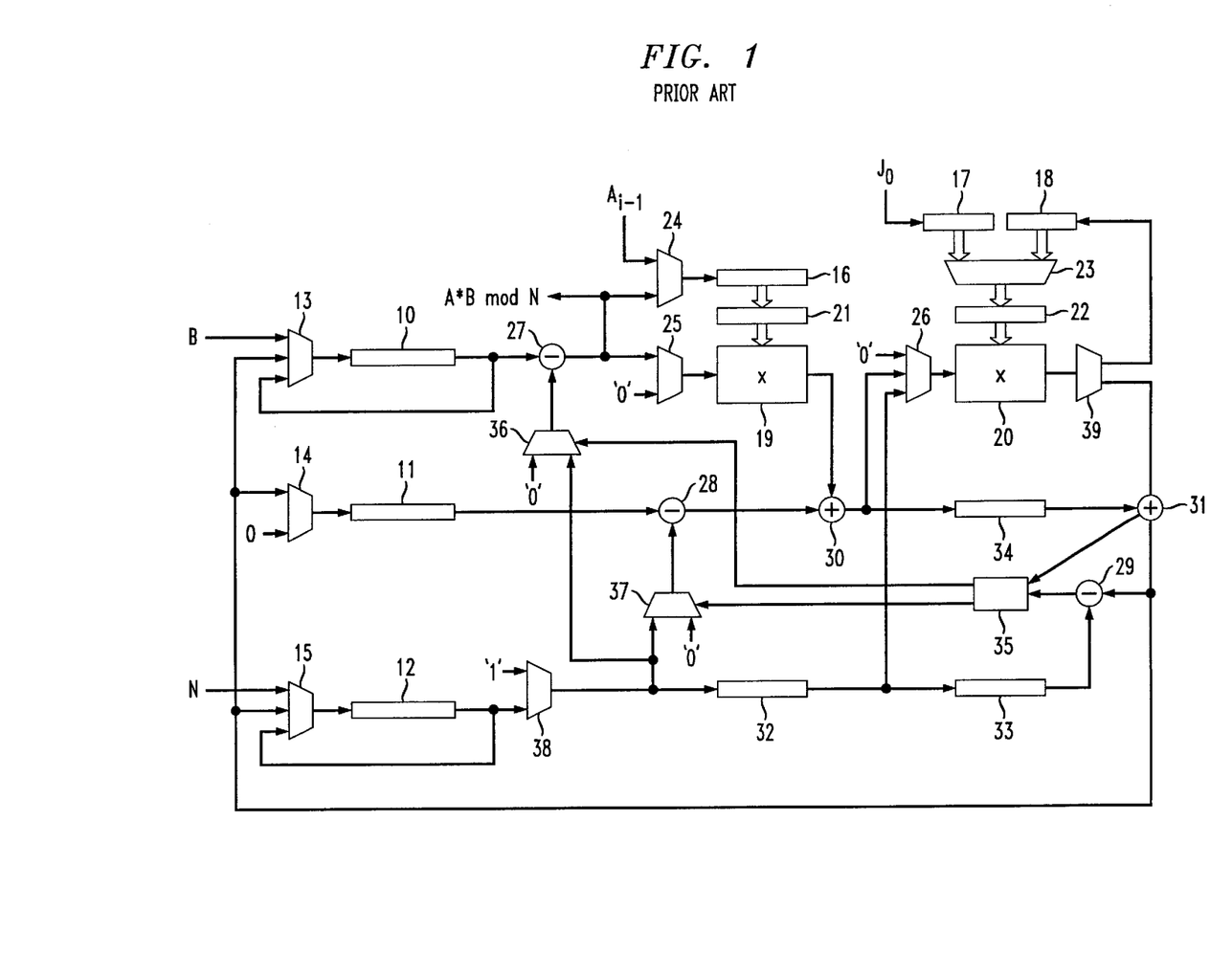
FIG. 1 shows a modular arithmetic coprocessor, according to the prior art.

Integrated circuits dedicated to such applications are commercially available. For example, one such integrated circuit is manufactured by SGS-THOMSON MICROELECTRONICS S.A. and is built around a central processing unit and an arithmetic coprocessor. This product has a reference designation of ST16CF54 and is dedicated to the performance of modular computations. The coprocessor enables the processing of modular operations using the Montgomery method. Further information on this coprocessor can be found in European Patent Application No. 0 601 907 A2. FIG. 1 shows a modular arithmetic coprocessor according to the prior art. This figure corresponds to FIG. 2 of the European application.

The basic operation of modular computations according to the Montgomery method is known as the $P_{field}$ method. In this method, three binary data elements A (multiplicand), 13 (multiplier) and N (modulo) are encoded on an integer number of n bits which is used to produce a binary data element referenced as $P(A, B)_N$. This binary data element is encoded on n bits such that $P(A, B)_N = A*B*I \bmod N$, where I is an error due to the Montgomery method. The Montgomery method uses a k-bit computation base and analyzes the n-bit words into m words of k bits, such that $m*k>n>(m-1)*k$. The Montgomery method operates as follows, with i being an index varying from 0 to m−1:

$X = S_i + A_i * B$;

$Y_0 = (X * J_0) \bmod 2^k$;

$Z = X + (N * Y_0)$;

$S_{i+1} = Z \backslash 2^k$, \ being an integer division;

if $S_{i+1}$ is greater than N, then N is subtracted from $S_{i+1}$ at the next iteration;

$A_i$ corresponds to a k-bit word of the binary date element A;

$S_i$ corresponds to an updated result of the $P_{field}$ operation; and $S_m = P(A, B)_N = A*B*I \bmod N$.

To obtain a modular multiplication $A*B \bmod N$, it is necessary to eliminate the error I. Error I is known and equals $2^{-m*k}$. To eliminate the error I, a second $P_{field}$ operation is performed: $P(S_m, H)_N$, where H is a binary data element encoded on m words of k bits and equals $2^{2m*k} \bmod N$. The generation of a parameter H can be done by successive subtractions by a computation coprocessor such as the one described in the European application. It is also possible to combine successive subtractions and $P_{field}$ operations to compute H as disclosed in the European Patent Application EP-A-0 712 070.

When modular multiplications are performed with data elements of variable size, the value of H may assume different values as a function of the sizes of A, B and N. In general, H has the value $2^x \bmod N$, with x and N being non-zero integers. This is explained in the European Patent Application EP-A-712 071.

Furthermore, the coprocessor is also used to perform computations on operands with sizes greater than the maximum size of the registers of the coprocessors. The European Patent Document EP-A-0 785 502 discloses a successive subtraction circuit for processing values of N having a size twice that of the registers of the coprocessor.

SUMMARY OF THE INVENTION

A computation circuit performs successive subtractions while operating twice as fast as prior art circuits performing the same computation. A corresponding method enables the performance of modular computations in a finite field (or Galois field), denoted as $GF(2^n)$, without having to perform divisions.

An objective of the invention is to provide a modular arithmetic coprocessor comprising a circuit for the computation of an error correction parameter $H = 2^x \bmod N$ associated with the Montgomery method, with x and N being non-zero integers. The computation circuit comprises a first shift register to hold intermediate values of H and a second register to hold N. The computation circuit further comprises first means for the series subtraction of either zero, N, twice N, or three times N from the contents of the first register. A multiplication circuit multiples by four the result provided by the first means. Second means are used to ascertain whether the result provided by the multiplication circuit is greater or smaller than N, twice N, or three times N. A third means produces twice N and three times N. The computation circuit further comprises third and fourth k-bit registers to process data elements of a size twice that of the registers.

Another objective of the invention is to provide a method for producing an error correction parameter $H = 2^x \bmod N$ in a modular arithmetic coprocessor. This error correction parameter is associated with the Montgomery method, with x and N being non-zero integers. An intermediate value of H is stored in a first register and N is stored in a second register. Either zero, N, twice N or three times N is subtracted in series from the contents of the first register. The result of this subtraction is multiplied by four to obtain a new intermediate value of H. The new intermediate value of H is compared with N, twice N, and three times N. Twice N and three times N are produced permanently from N.

It is possible to have alternative embodiments of the invention corresponding to the different cases that arise. These alternative embodiments can be combined with the teachings of the referenced European patent applications.

BRIEF DESCRIPTION OF THE DRAWINGS

The invention will be understood more clearly and other features and advantages shall appear from the following description, which makes reference to the appended drawings, of which.

DETAILED DESCRIPTION OF THE PREFERRED EMBODIMENTS

FIG. 1 shows a prior art modular arithmetic coprocessor, as disclosed in document D2. The coprocessor comprises three shift registers 10, 11 and 12, each with a series input and output. The shift registers 10, 11 and 12 each comprise the same number K of cells, with K=m*k. The shift registers 10, 11 and 12 are subdivided, for example, into registers of K/2 cells. Shift registers 10, 12 are subdivided into k-bit registers. Multiplexers 13, 14 and 15 are respectively connected to shift registers 10, 11 and 12, and are also placed before the subdivisions, if they exist. The three registers 16, 17 and 18 each comprise k cells. These three registers 16, 17 and 18 are parallel output and series input registers.

Two multiplication circuits 19, 20 each comprise a series input, a parallel input, and a series output. The parallel input of the multiplication circuit 19 is connected to the output of the shift register 16 by a k-cell storage flip-flop circuit 21. The parallel input of the multiplication circuit 20 is connected to one of the outputs of the shift registers 17 or 18 by a k-cell storage flip-flop circuit 22. This flip-flop circuit 22 is connected to one of the outputs of the shift registers 17, 18 by a multiplexer 23. Multiplexer 23 has two parallel inputs and one parallel output.

The coprocessor further comprises multiplexers 24, 25, 26, 36, 37, 38, a demultiplexer 39, series subtraction circuits 27, 28, 29, series addition circuits 30, 31, delay circuits 32, 33, 34 for delaying propagation of binary data by k cycle periods, and a storage circuit 35 to store the result of the comparison. For further details on the embodiment and operation of this circuit, those skilled in the art may refer to European application 0 601 907 A2.

Figure 2:
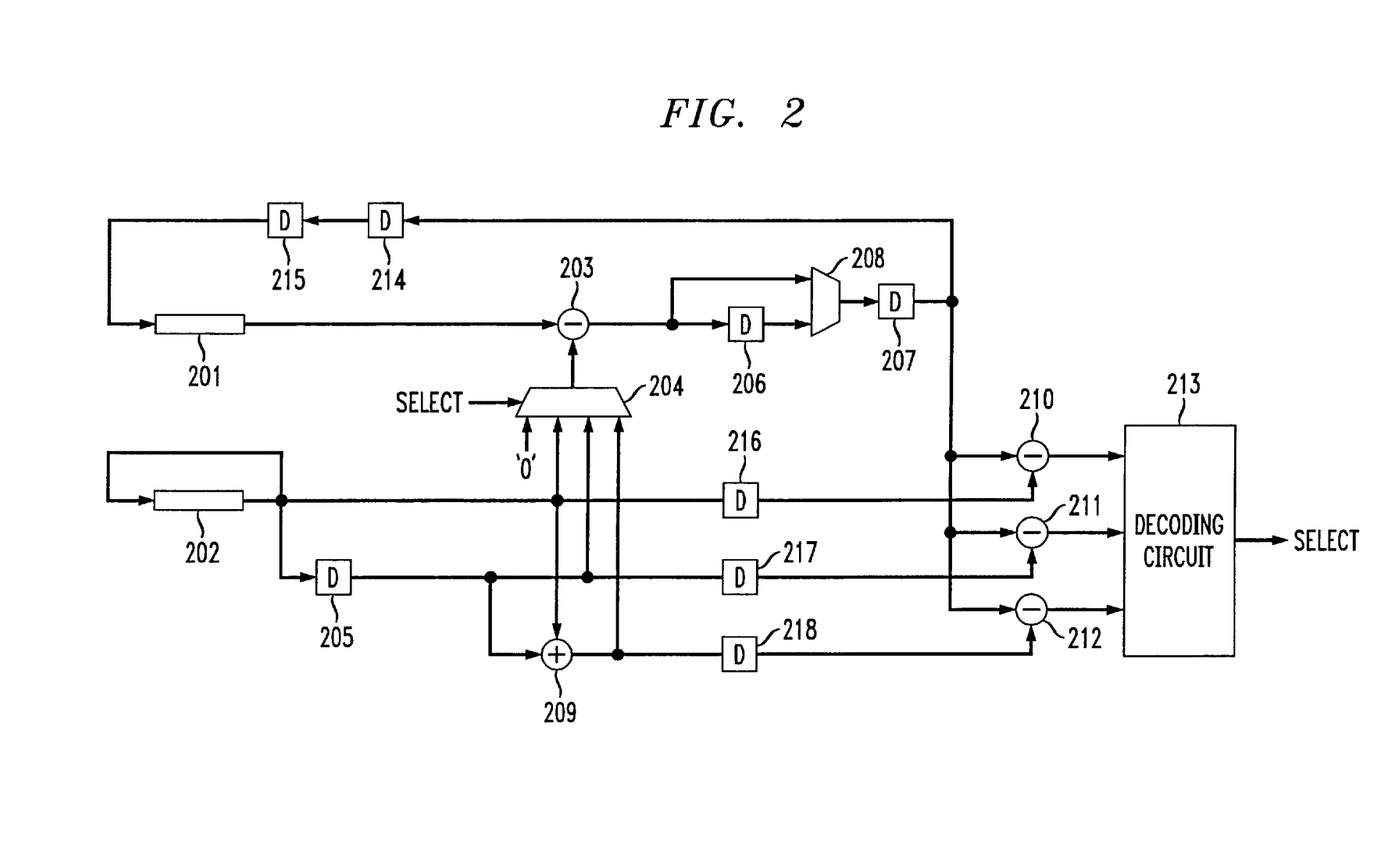
FIG. 2 shows a circuit to carry out successive subtractions, according to the present invention.

FIG. 2 shows a successive subtraction circuit of the invention for computing the error correction parameter $H=2^x$ mod N. The successive subtraction circuit of FIG. 2 comprises first and second registers 201 and 202, each with a k-bit shift, and each having a one series input and a one series output. The input of the second register 202 is connected to its output. A first subtraction circuit 203 has a first and a second series input, and a one series output. The first series input is connected to the output of the first register 201. A first multiplexer 204 has four data inputs, one selection bus input, and one output. The output is connected to the second input of the first subtraction circuit 203. The first data input permanently receives a logic zero. The second data input is connected to the output of the second register 202.

First, second and third delay circuits 205, 206 and 207 each have a one series input and a one series output. Each delay circuit 205–207 delays the data elements by one clock cycle between the input and output, and is capable of being reset through means not shown. Those skilled in the art will use, for example, synchronous D-type flip-flop circuits have a resetting input. The input of the first delay circuit 205 is connected to the output of the second register 202. The output of the first delay circuit 205 is connected to the third data input of the first multiplexer 204. The input of the second delay circuit 206 is connected to the output of the first subtraction circuit 203.

A second multiplexer 208 has a first and a second input, and one output. The first input is connected to the output of the first subtraction circuit 203 and the second input is connected to the output of the second delay circuit 206. The output of the second multiplexer 208 is connected to the input of the third delay circuit 207. A series addition circuit 209 has a first and a second series input, and a one series output. The first input is connected to the output of the first delay circuit 205 and the second input is connected to the output of the second register 202. The output of the series addition circuit 209 is connected to the fourth data input of the first multiplexer 204. Second, third and fourth series subtraction circuits 210–212 each has a first and a second series input, and a one series output. The first input of each of the second to fourth subtraction circuits 210–212 is connected to the output of the third delay circuit 207.

A decoding circuit 213 has three inputs, and one selection bus output. The three inputs are respectively connected to the outputs of the second to fourth subtraction circuits 210–212. The bus output is connected to the bus input of the first multiplexer 204. Fourth to eighth delay circuits 214, 215, 216, 217 and 218 are identical to the first to third delay circuits 205–207. The fourth to eighth delay circuits 214–218 are connected as follows. The input of the fourth delay circuit 214 is connected to the output of the third delay circuit 207, and its output is connected to the input of the fifth delay circuit 215. The output of the fifth delay circuit 215 is connected to the input of the first register 201. The input of the sixth delay circuit 216 is connected to the output of the second register 202. The input of the seventh delay circuit 217 is connected to the output of the first delay circuit 205. The input of the eighth delay circuit 218 is connected to the output of the addition circuit 209. The output of the sixth delay circuit 216 is connected to the second input of the second subtraction circuit 210. The output of the seventh delay circuit 217 is connected to the second input of the third subtraction circuit 211. The output of the eighth delay circuit 218 is connected to the second input of the forth subtraction circuit 212.

To make the subtraction circuits, addition circuits and registers, those skilled in the art may refer, for example, to European application 0 601 907 A2. Functionally, the first register 201 is used to store the different intermediate values of the computation of H, with the least significant values being positioned towards the output. The second register 202 is used to store the modulo N value, with the least significant bit being positioned towards the output. In the example described, the data elements are positioned in the first and second registers 201, 202 with the least significant bit being close to the output and the most significant bit being towards the input.

The first delay circuit 205 receives N and produces twice N. The addition circuit 209 adds N and twice N to obtain three times N. The first delay circuit 205 and the addition circuit 209 have to be considered as means for producing twice N and three times N from N. Those skilled in the art will observe that if an addition circuit 209 as described in the above-referenced European application is used, a delay is created at the output. This desynchronizes three times N from N and twice N by one clock cycle. This slight problem is resolved by means of a desynchronization of the addition circuit by half a clock cycle with respect to the other elements of the circuit by using a different active edge. To preserve the synchronization, it is also possible to add additional delay circuits to the wires conveying the other data elements. Another possibility is to store twice N and three times N in other registers, but this has the effect of considerably increasing the size of the integrated circuit.

The first multiplexer 204 receives zero, N, twice N and three times N in series at four distinct inputs to provide at one output a data element corresponding to only one of the four inputs. From the data element of the first register 201, which corresponds to an intermediate value of H, the first subtraction circuit 203 subtracts the data elements coming from the output of the first multiplexer 204. The first subtraction circuit 203 and the first multiplexer 204 have to be considered as subtraction means to carry out the series subtraction of either zero, N, twice N, or three times N from the contents of the first register.

The second and third delay circuits 206, 207 and the second multiplexer 208 have to be considered as a multiplication circuit to multiply by four or by two the result provided by the first subtraction circuit 203. Each delay circuit 206 or 207 has the effect of multiplying the data element that enters the delay circuit 206 or 207 by two by adding a zero in the form of a least significant bit. The second multiplexer 208 is used to shunt or not shunt the second delay circuit 206, thus selecting a multiplication by two or a multiplication by four. The multiplication by two is not necessary in the invention unless it is sought to compute $H=2^x$ mod N, with x−n being an odd value and n being the size of N. If it is desired to make a circuit that can be used solely with x−n being an even value, the second multiplexer 208 is superfluous and only a circuit of multiplication by four will be used.

The second to fourth subtraction circuits 210–212 and the decoding circuit 213 have to be considered as comparison means to ascertain that the result provided by the multiplication circuit is greater than or smaller than N, twice N and three times N. The second to fourth subtraction circuits 210–212 simultaneously subtract respectively N, twice N and three times N from the result provided by the multiplication circuit. The decoding circuit 213 comprises a combinational logic circuit to ascertain that the result provided by the multiplication circuit is greater than or smaller than N, twice N or three times N. The decoding circuit 213 stores the result of the comparison to use it subsequently. The decoding circuit 213 furthermore comprises a storage flip-flop circuit designed, at the end of each of the successive subtractions performed, to store the result of the comparison. This comparison result determines what should be the input of the first multiplexer 204 that has to be connected to the second input of the first subtraction circuit 203 for the next subtraction. The fourth and fifth delay circuits 214, 215 are used to increase the size of the first register 201 to store data elements whose size is greater than the size of the register. The sixth to eighth delay circuits 216–218 are used to mask the delay caused by the first subtraction circuit 203.

The following explanations will enable those skilled in the art to carry out the appropriate sequencing of the circuit of FIG. 2 to obtain the computation of $H=2^x$ mod N, where N is encoded on n bits, x being greater than n, and n being smaller than or equal to K. A/ loads the two's complement of N, referenced H(0) into the first register 201 and loads the n bits of 11 into the second register 202 as least significant bits. The K−n most significant bits of the second register 202 are set at zero. The resetting of the first to third delay circuits 205–207, the setting of a sequencing loop index i at zero, and the setting of the bus output of the decoding circuit 213 are performed so that the comparison means indicates that the first input of the first multiplexer 204 is to be connected to the second input of the first subtraction circuit 203 to subtract "0" during a first loop iteration.

B/ makes the loop comprising the steps B1 to B5 so long as i<x−n;

B1/ is the simultaneous shifting of the contents of the first and second K-bit registers 201, 202 to subtract. from H(i) either 0, N, 2N or 3N;

B2/ obtains H(i+2) by multiplying the result of the subtraction by 2 if i=x−n−1, or obtains H(i+2) by multiplying the result of the subtraction by 4 if i≠x−n−1, or B3/ stores H(i+2) in the first register 201 and in the fourth and fifth delay circuits 214, 215;

B4/ compares H(i+2) with N, twice N and three times N and, at the end of the comparison, positions the first multiplexer 204 to:
subtract 0 during the next iteration of the loop if H(i+2) is smaller than N,
subtract N during the next iteration of the loop if N<H(i+2)<2*N,
subtract twice N during the next iteration of the loop if 2*N<H(i+2)<3*N,
subtract three times N during the next iteration of the loop if 3*N<H(i+2), B5/ increments the loop sequencing index i by two: i=i+2, C/ shifts the first register 201 by one bit and carries out the additional shift of the first register by one bit if i=x−n, and D/ the error correction parameter H is then present in the first register 201.

Those skilled in the art will note that the multiplication by two in step B2 can take place only for the last iteration of the loop B and only if x−n is an odd number. The simultaneous running of steps B1 to B1 requires K+4 clock cycles because the first subtraction circuit to the fourth subtraction circuit need an additional cycle for the complete performance of a subtraction. The computation of $H=2^x$ mod N requires in the worst case, which corresponds to x=2n=2K, K*(K+4)/2 clock cycles instead of K*(K+1) clock cycles for the circuit disclosed in document D2. Furthermore, it is possible to use different variations and improvements of the computation methods disclosed in documents D3 and D5.

With respect to the initial conditions, it is possible to load H(0)=0 into the first register 201 and begin the first iteration of the loop B by a subtraction of N instead of a subtraction of 0. It is possible to use first and second registers 201, 202 of variable sizes so that they are particularly well suited to the size of the data elements. It is also possible to reduce the number of successive subtractions by using $P_{field}$ type operations as described in European application EP-A-0 712 070.

Figure 3:
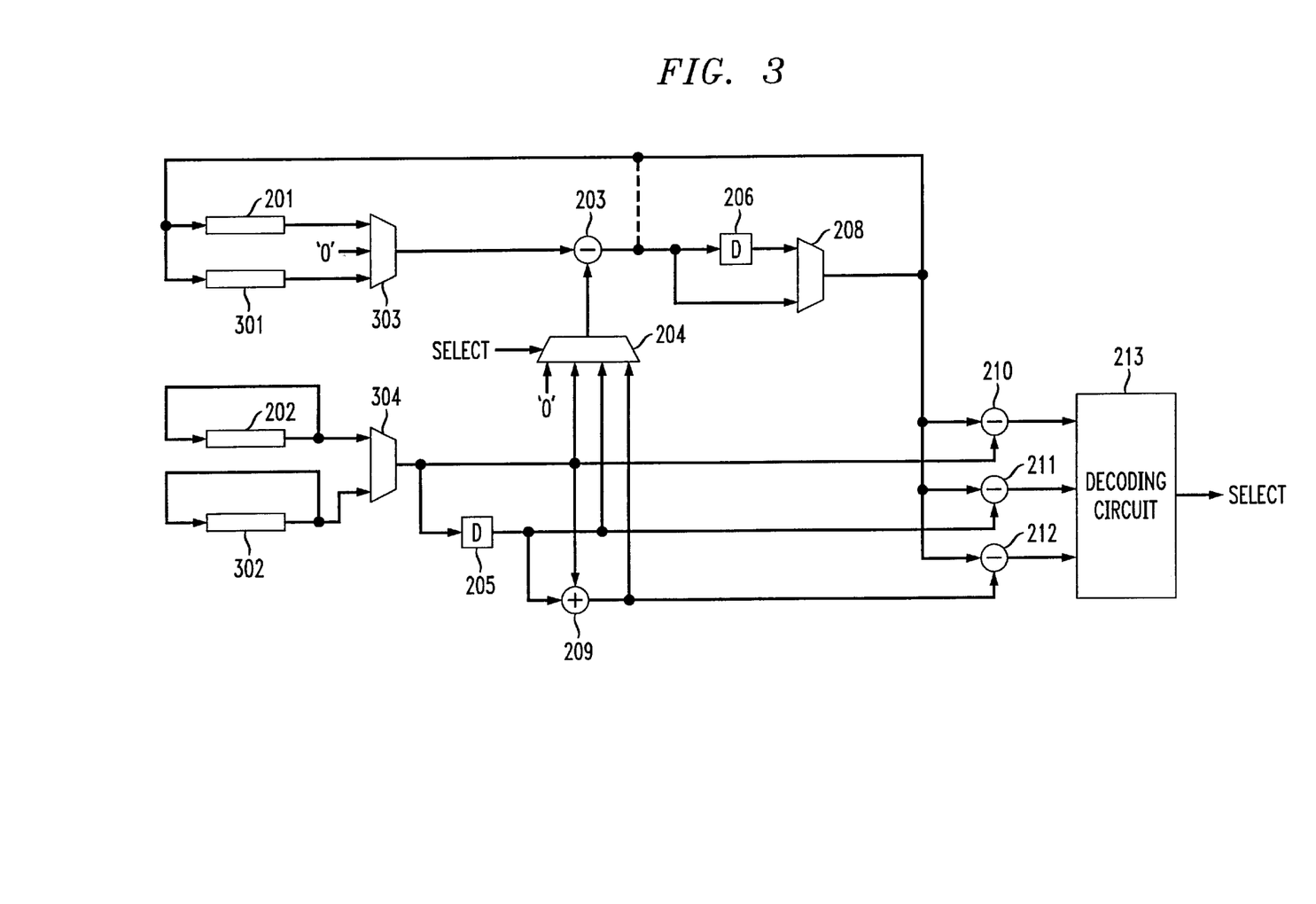
FIG. 3 shows an alternative embodiment for performing computations on a word size greater than the size of the registers of the coprocessor, according to the present invention.

In European application EP-A-0 785 502, an additional register is added to obtain an H computing circuit that can compute H when N=2*K. An improvement of this kind is also possible for the circuit of FIG. 2. Other improvements are possible to reduce the size of certain elements and gain some cycle periods during an iteration. The circuit of FIG. 3 represents a successive subtraction circuit according to the invention when it is desired to compute H with data elements of a size greater than the size of the registers of the coprocessor. Furthermore, the circuit of FIG. 3 comprises other improvements.

In the circuit of FIG. 3, all the elements of FIG. 2 have been kept except the third to eighth delay circuits 207 and 214–218, which have been eliminated to diminish the space requirement and gain some clock cycles. The first subtraction circuit creates a delay, during its operation, by one clock cycle. It is enough to use this delay as a multiplication circuit by two as done in document D2. To obtain a multiplication by four, only the second delay circuit 206 is necessary. This leads to the elimination of thus third delay circuit 207. Since the delay created by the working of the first subtraction circuit 203 is used functionally, it is no longer necessary to compensate for it. This makes the sixth to eighth delay circuits 216–218 unnecessary. The fourth and fifth delay circuits 214, 215 have been eliminated because the two least significant bits of H(i+2) are always zero and it is not necessary to store them since they are already known.

The circuit of FIG. 3 further comprises third and fourth shift registers 301, 302 with shifts of k bits each. Each third and fourth shift registers 301, 302 has a one series input and a one series output. The input of the third register 301 is connected with the input of the first register 201, and connected to the output of the second multiplexer 208. The input of the fourth register 302 is connected to its own output.

A third multiplexer 303 comprises a first to a third input, and one output. The first input is connected to the output of the first register 201. The second input permanently receiving a logic zero. The third input is connected to the output of the third register 301, and. the output is connected to the first input of the first subtraction circuit 203. A fourth multiplexer 304 has a first and a second input, and one output. The first input is connected to the output of the second register 202. The second input is connected to the output of the fourth register 302. The output is connected to the second input of the first multiplexer 204, to the input of the first delay circuit 205, and to the second input of the second subtraction circuit 210.

The third multiplexer 303 enables, firstly, the use of two registers and, secondly, the sending of zeros to the first input of the first subtraction circuit 203. The sending of zeros makes it possible not to have to reset the first and third registers 201, 301 before carrying out a first subtraction, and also makes it possible to send zeros as significant bits when the least significant bits have not been stored.

In another improvement not shown in the drawing, the internal carry value of the circuit is used as an output. for the second to fourth subtraction circuits 210–212 to obtain the result of the comparison one clock cycle Earlier. The following explanations will enable those skilled in the art to achieve the appropriate sequencing of the circuit of FIG. 3 to carry out the computation of $H=2^x \bmod N$, with N being encoded on n bits, x being greater than n, and n being greater than K and smaller than or equal to 2*K.

A1/ loads the K least significant bits of N into the second register 202 and loads the n−K most significant bits of N into the fourth registers 302 as least significant bits. The 2*K−N most significant bits of the fourth register 302 are reset, which resets the first delay circuit 205;

A2/ shifts the contents of the second register 202 by K bits and then shifts the contents of the fourth register 302 by K bits. The third multiplexer 303 is positioned to send a sequence of zeros to the first subtraction circuit 203, and the first multiplexer 204 is positioned to send N to the second input of the subtraction circuit 203 to subtract N from zero;

A3/ multiplies the result of the subtraction by 4 by delaying the result, the result of the multiplication being called H(2);

A4/ stores the bits of H(2) that have place values $2^2$ to $2^{K+1}$ in the first register 201, and stores the bits of H(2) having place values $2^{K+2}$ to $2^{2K+1}$ in the third register 301;

A5/ compares H(2) with N, twice N and three times N, and positions the first multiplexer 204 at the end of the comparison to:

subtract 0 during the first step B1 if H(2) is smaller than N, subtract N during the first step B1 if N<H(2)<2*N, subtract twice N during the first step B1 if 2*N<H(2)<3*N, subtract three times N during the first step B1 if 3*N<H(2), and resetting a loop sequencing index i at two: i=i+2;

B/ makes a loop comprising the steps B1 to B5 so long as i<x−n;

B1/ shifts the contents of the second register 202 by two bits with the simultaneous supply of two successive zeros by the third multiplexer 303, then simultaneously shifts the contents of the first and second registers 201 and 202 by K−1 bits, then simultaneously shifts the contents of the first and fourth registers 201 and 302 by two bits, and then simultaneously shifts the contents of the third and fourth registers 301 and 302 by K−2 bits, then shifts the third register 301 by two bits to subtract either 0, N, 2N or 3N from H(i);

B2/ obtains H(i+2) by multiplying the result of the subtraction by 2 if i=x−n−1, or obtains H(i+2) by multiplying the result of the subtraction by "4" if i≠x−n−1, B3/ stores the bits of H(i+2) that have place values $2^2$ to $2^{K+1}$ in the first register 201 and stores the bits of H(i+2) that have place values $2^{K+2}$ to $2^{2K+1}$ in the third register 301;

B4/ compares H(i+2) with N, twice N and three times N and, at the end of the comparison, positions the first multiplexer 204 to:

subtract 0 during the next iteration of the loop if H(i+2) is smaller than N, subtract N during the next iteration of the loop if N<H(i+2)<2*N, subtract twice N during the next iteration of the loop if 2*N<H(i+2)<3*N, subtract three times N during the next iteration of the loop if 3*N<H(i+2);

B5/ increments the loop sequencing index i by two: i=i+2; and

C/ the error correction parameter H is then present in the first register 201.

Those skilled in the art will note that, during the second. iteration of the loop, one clock cycle less is needed for the storage of H in the first and third registers 201 and 301 if x−n is an odd number. An improvement can be made so that it is not necessary to be take special care during this last iteration for the storage. It is enough to connect the inputs of the first and third registers 201, 301 directly to the output of the first subtraction circuit 203. Those skilled in the art will note that the circuit of FIG. 3 can easily be transposed to the circuit of FIG. 2 by using only the first and second registers 201 and 202.

Figure 4:
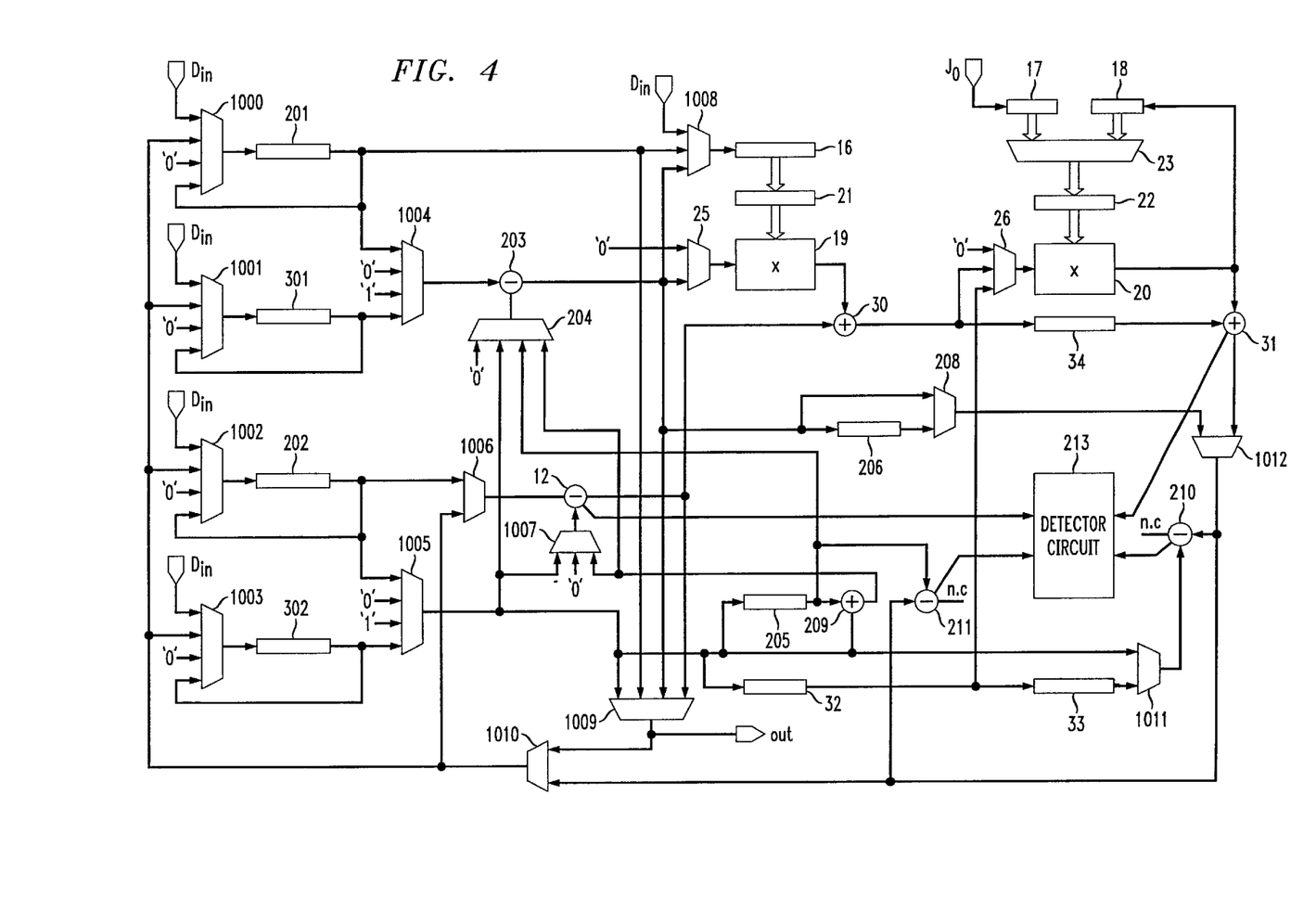
FIG. 4 shows a modified modular arithmetic coprocessor, according to the present invention.

The circuit of FIG. 4 provides a way of integrating the circuit of FIG. 3 into the circuit of FIG. 1. This figure is given purely by way of an indication that there are numerous possibilities of integration embodiments open to those skilled in the art. In FIG. 4, the elements corresponding identically to the elements of FIG. 3 use the same references. The elements in FIG. 4 that correspond identically to the elements of FIG. 1, but have not been used by FIG. 3, use the same references. The multiplexers 1000–1012 correspond to multiplexers that have been modified or added to make it possible for the functions of the circuit of FIGS. 1 and 3 to be combined.

What is claimed is:

1. A modular arithmetic coprocessor comprising:
circuit for computation of an error correction parameter $H=2^x$ mod N associated with the Montgomery method, with x and N being non-zero integers, the circuit comprising
- a first shift register for holding intermediate values of H,
- a second shift register for holding values of N,
- first means connected to an output of said first shift register for providing a result for a series subtraction of either zero, N, twice N, or three times N from the intermediate values of H held in said first shift register,
- a multiplication circuit connected to an output of said first means for multiplying by four the result provided by said first means,
- second means connected to an output of said multiplication circuit for determining whether a result provided by said multiplication circuit is greater or smaller than N, twice N or three times N, and
- third means connected to an output of said second shift register for providing values of twice N and three times N.

2. A modular arithmetic coprocessor according to claim 1, further comprising a third shift register connected to said first means and a fourth shift register connected to said third means.

3. A modular arithmetic coprocessor according to claim 1, wherein said first means comprises:
- a first multiplexer having four inputs respectively receiving in series four distinct inputs of zero, N, twice N and three times N, and having an output for providing a data element corresponding to only one of the four inputs; and
- a first subtraction circuit connected to the output of said first multiplexer and to an output of said first shift register for subtracting from the output of said first shift register the data element provided by the output of said first multiplexer.

4. A modular arithmetic coprocessor according to claim 1, wherein said multiplication circuit comprises at least one delay circuit.

5. A modular arithmetic coprocessor according to claim 4, wherein said multiplication circuit comprises a second multiplexer to by-pass the at least one delay circuit when multiplication by two is performed.

6. A modular arithmetic coprocessor according to claim 1, wherein said second means comprises:
- a second, a third, and a fourth subtraction circuit each connected to an output of said multiplication circuit for respectively subtracting N, twice N and three times N from a result provided by said multiplication circuit; and
- a decoding circuit connected to an output of said second, said third, and said fourth subtraction circuits for determining from respective results provided by said second, said third, and said fourth subtraction circuits if the results provided by said multiplication circuit are greater or smaller than N, twice N or three times N.

7. A modular arithmetic coprocessor according to claim 1, wherein said third means comprises:
- a delay circuit connected to the output of said second shift register for receiving N and producing twice N; and
- a series addition circuit connected to the output of said second shift register and to an output of said delay circuit for adding N and twice N to obtain three times N.

8. A modular arithmetic coprocessor comprising:
a circuit for the computation of an error correction parameter $H=2^x$ mod N associated with the Montgomery method, with x and N being non-zero integers, the circuit comprising
- a first and a third shift register for holding intermediate values of H,
- a third multiplexer connected to an output of said first and third shift registers;
- a second and a fourth shift register for holding values of N,
- a fourth multiplexer connected to an output of said second and fourth shift registers;
- first means connected to an output of said third multiplexer for providing a result for a series subtraction of either zero, N, twice N, or three times N from the intermediate values of H held in said first and third shift registers,
- a multiplication circuit connected to an output of said first means for multiplying by four the result provided by said first means,
- second means connected to an output of said multiplication circuit for determining whether a result provided by said multiplication circuit is greater or smaller than N, twice N or three times N, and
- third means connected to an output of said fourth multiplexer for providing values of twice N and three times N.

9. A modular arithmetic coprocessor according to claim 8, wherein said first means comprises:
- a first multiplexer having four inputs respectively receiving in series four distinct inputs of zero, N, twice N and three times N, and having an output for providing a data element corresponding to only one of the four inputs; and
- a first subtraction circuit connected to the output of said first multiplexer and to an output of said third multiplexer for subtracting from the output of said third multiplexer the data element provided by the output of said first multiplexer.

10. A modular arithmetic coprocessor according to claim 8, wherein said multiplication circuit comprises at least one delay circuit.

11. A modular arithmetic coprocessor according to claim 10, wherein said multiplication circuit comprises a second multiplexer to shunt the at least one delay circuit when multiplication by two is performed.

12. A modular arithmetic coprocessor according to claim 8, wherein said second means comprises:
- a second, a third, and a fourth subtraction circuit each connected to an output of said multiplication circuit for respectively subtracting N, twice N and three times N from a result provided by said multiplication circuit; and
- a decoding circuit connected to an output of said second, said third, and said fourth subtraction circuit for determining from respective results provided by said second, said third, and said fourth subtraction circuits if the results provided by said multiplication circuit are greater or smaller than N, twice N or three times N.

13. A modular arithmetic coprocessor according to claim 8, wherein said third means comprises:
- a delay circuit connected to the output of said fourth multiplexer for receiving N and producing twice N; and
- a series addition circuit connected to the output of said fourth multiplexer and to an output of said delay circuit for adding N and twice N to obtain three times N.

14. A modular arithmetic coprocessor comprising:
a circuit for the computation of an error correction parameter $H=2^x$ mod N associated with the Montgomery method, with x and N being non-zero integers, the circuit comprising
a first and a third shift register for holding intermediate values of H,
a third multiplexer connected to an output of said first and third shift registers;
a second and a fourth shift register for holding values of N,
a fourth Multiplexer connected to an output of said second and fourth shift registers;
a first multiplexer having four inputs respectively receiving in series four distinct inputs of zero, N, twice N and three times N, and an output for providing a data element corresponding to only one of the four inputs,
a first subtraction circuit connected to the output of said first multiplexer and to an output of said third multiplexer for subtracting from the output of said first and third shift registers the data element provided by the output of said first multiplexer,
a multiplication circuit connected to an output of said first subtraction circuit for multiplying by four the result provided by said first means,
a second, a third, and a fourth subtraction circuit each connected to an output of said multiplication circuit for respectively subtracting N, twice N and three times N from a result provided by said multiplication circuit,
a decoding circuit connected to an output of said second, said third, and said fourth subtraction circuit for determining from respective results provided by said second, said third, and said fourth subtraction circuits if the results provided by said multiplication circuit are greater or smaller than N, twice N or three times N,
a delay circuit connected to the output of said fourth multiplexer for receiving N and producing twice N, and
a series addition circuit connected to the output of said fourth multiplexer and to an output of said delay circuit for adding N and twice N to obtain three times N.

15. A modular arithmetic coprocessor according to claim 14, wherein said multiplication circuit comprises at least one delay circuit.

16. A modular arithmetic coprocessor according to claim 15, wherein said multiplication circuit comprises a second multiplexer to shunt the at least one delay circuit when multiplication by two is performed.

17. A method for computing an error correction parameter $H=2^x$ mod N associated with the Montgomery method, with x and N being non-zero integers, in a modular arithmetic coprocessor in which an intermediate value of H is stored in a first shift register and a value N is stored in a second shift register, the method comprising the steps of:
subtracting in series either zero, N, twice N, or three times N from the intermediate values of H stored in the first shift register;
multiplying by four a result from the step of subtracting to obtain a new intermediate value of H;
permanently producing twice N and three times N from N; and
comparing the new intermediate value of H with N, twice N, and three times N.

18. A method according to claim 17, wherein the step of subtracting further comprising the steps of:
receiving in series four distinct inputs of zero, N, twice N and three times N; and
providing a data element corresponding to only one of the four inputs.

19. A method according to claim 17, wherein the step of comparing further comprising the steps of:
respectively subtracting N, twice N and three times N from the new intermediate value of H; and
determining if the new intermediate value of H is greater or smaller than N, twice N or three times N.

20. A method for computing an error correction parameter $H=2^x$ mod N associated with the Montgomery method, with x and N being non-zero integers, in a modular arithmetic coprocessor in which an intermediate value of H is stored in a first and a third shift registers and a value N is stored in a second and a fourth shift register, the method comprising the steps of:
subtracting in series either zero, N, twice N, or three times N from the intermediate values of H stored in the first and third shift registers;
multiplying by four a result of the subtraction to obtain a new intermediate value of H;
permanently producing twice N and three times N from N; and
comparing the new intermediate value of H with N, twice N, and three times N.

21. A method according to claim 20, wherein the step of subtracting further comprising the steps of:
receiving in series four distinct inputs of zero, N, twice N and three times N; and
providing a data element corresponding to only one of the four inputs.

22. A method according to claim 20, wherein the step of comparing further comprising the steps of:
respectively subtracting N, twice N and three times N from the new intermediate value of H; and
determining if the new intermediate value of H is greater or smaller than N, twice N or three times N.

* * * * *

UNITED STATES PATENT AND TRADEMARK OFFICE
CERTIFICATE OF CORRECTION

PATENT NO. : 6,230,178 B1
DATED : May 8, 2001
INVENTOR(S) : Alain Pomet

It is certified that error appears in the above-identified patent and that said Letters Patent is hereby corrected as shown below:

Column 1,
Line 38, delete: "13", insert -- B --

Column 2,
Line 46, delete: "first: register", insert -- first register --

Column 5,
Line 33, delete: "or Smaller than", insert -- or smaller than --
Line 59, delete: "11", insert -- N --.

Column 6,
Line 4, delete: "subtract. from", insert -- subtract from --
Line 31, delete: "B1 to B1", insert -- B1 to B5 --
Line 67, delete: "thus", insert -- the --

Column 7,
Line 20, delete: "and. the", insert -- and the --
Line 37, delete: "output. for", insert -- output for --
Line 39, delete: "cycle Earlier.", insert -- cycle earlier. --

Column 8,
Line 45, delete: "second.", insert -- second --

Column 9,
Line 3, delete: "circuit for", insert -- a circuit for --

Signed and Sealed this

Eleventh Day of September, 2001

Attest:

NICHOLAS P. GODICI
*Attesting Officer*  *Acting Director of the United States Patent and Trademark Office*